J. J. O'DOHERTY.
BRAKE FOR ROAD VEHICLES.
APPLICATION FILED NOV. 23, 1910.
998,979.
Patented July 25, 1911.
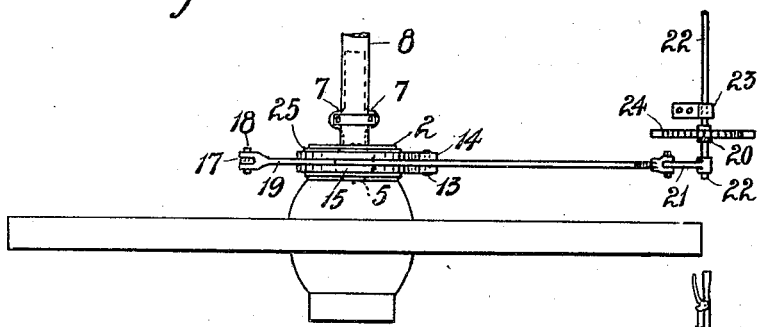
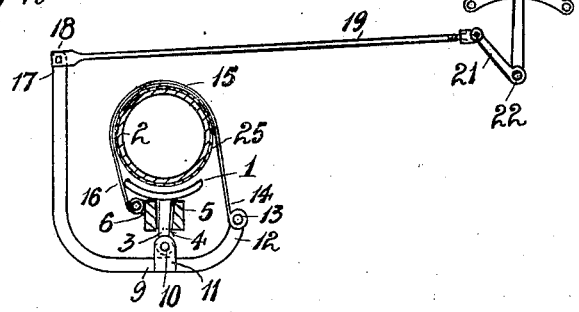
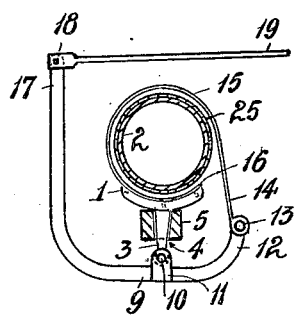
WITNESSES
INVENTOR
James Joseph O'Doherty
COLUMBIA PLANOGRAPH CO., WASHINGTON, D. C.

UNITED STATES PATENT OFFICE.

JAMES JOSEPH O'DOHERTY, OF WINDSOR, VICTORIA, AUSTRALIA.

BRAKE FOR ROAD-VEHICLES.

998,979.             Specification of Letters Patent.     Patented July 25, 1911.

Application filed November 23, 1910. Serial No. 593,846.

*To all whom it may concern:*

Be it known that I, JAMES JOSEPH O'DOHERTY, a subject of the King of Great Britain, residing at 14 Raleigh street, Windsor, in the State of Victoria, Commonwealth of Australia, commercial traveler, have invented an Improved Brake for Road-Vehicles, of which the following is a specification.

This invention refers to an improved brake for road vehicles of that kind known as hub brakes, and it has been specially devised in order to produce a cheap and effective brake, and is particularly useful on vehicles drawn by horses as when applied the load is at once eased off the animal's back.

The invention is illustrated by the accompanying drawings, whereof:—

Figure 1 is a plan showing the brake applied to the hub of a vehicle. Fig. 2 a vertical section through the brake, and Fig. 3 is a similar view to Fig. 2 showing a slightly modified construction.

According to this invention a brake block or cup 1 of suitable material, such as metal or plated wood is located beneath the inner nave 2 of either one or both of the vehicle wheels. The wearing or upper surface is curved or shaped to correspond with the contour of the nave, as shown, and is provided with a pin or shank 3 extending freely down through a hole or slot 4 formed in the enlarged head or bearing 5 of a bracket or support 6 securely attached by bolts 7 or other suitable means to the axle 8 of the vehicle. Both the shank and the slot in the head may be correspondingly tapered so as to provide a natural adjustment as the parts wear. The lower end of the shank 3 is pivotally connected to a lever brake bar 9 and to this end a pin 10 is passed through an eye on the end of the shank, which engages with lugs or jaws 11 rigidly attached to said brake bar.

The brake bar has its forward end 12 bent upwardly a short distance and connected, by an eye and jaw joint 13 for instance, to one end 14 of a band 15, which may be of steel or any other suitable material. This band passes over and practically completely around the nave where its other end 16 is either connected to the bracket 6, as in Fig. 2, or riveted or otherwise attached to the brake block or cup, as in Fig. 3. The other end 17 of the brake bar on the other side of the pivot 10 is also curved upwardly and above the axle and to its end is attached, as at 18 a connecting rod 19 wire or the like. This connecting rod is operated by means of a treadle or lever 20 and is adjustably connected to a crank 21 on a rockshaft 22, which extends transversely across the vehicle in bearings 23 when a brake is attached to the nave of each wheel. The lever 20, which is mounted on the rockshaft 22 may be a spring toothed one adapted to lock with a rack 24 secured in a suitable position on the vehicle. It will be evident that the slotted head 5 of the bracket 6 supports the mechanism when the brake is released.

In applying the brake the lever 20 is pushed forwardly thus causing the brake bar 9 to tilt on its pivot 10 and force the brake block or cup 1 up against the underside of the nave 2, while at the same time the lowering of the end 12 of the brake bar draws the end 14 of the brake band 15 downwardly so that said band is brought into frictional contact with practically the rest of the periphery of the nave thereby retarding the hub or positively preventing same from revolving according to the leverage applied. By reversing the lever the brake bar tilts in the opposite direction so that the cup 1 drops free of the nave and at the same time the band is lifted off said nave. The nave may have a wearing metal band 25 around it, which would be extended if the nave is not long enough for the width of brake band to be applied. It will be evident that the brake attachment might be reversed in which case the lever would be operated in the reverse manner, while furthermore when a brake is applied to two hubs the connecting rods 19 are attached to separate cranks on the rockshaft and operated simultaneously by the one lever.

Having now particularly described and ascertained the nature of my said invention and in what manner the same is to be performed, I declare that what I claim is:—

1. An improved brake for road vehicles consisting of a brake cup located beneath the nave and having a shank extending through a slotted rigid bracket, a lever brake bar pivoted to said shank, a brake band having one end fastened and passed around the nave and attached to one end of said brake bar, and means for operating the other end of said brake bar.

2. An improved brake for road vehicles consisting of a brake cup located beneath the nave and having a shank extending through a slotted rigid bracket, a lever brake bar pivoted to said shank and having its ends, on either side of its pivot, bent upwardly, a brake band passed over the nave with one end attached to the brake cup and the other to one end of the lever brake bar, a connecting rod or the like attached to the other end of said bar, and means for operating said rod.

3. An improved brake for road vehicles consisting of a brake cup located beneath the nave and having a shank extending through a slotted bracket rigidly secured to the axle, a lever brake bar pivoted to said shank and having its ends, on either side of its pivot, bent upwardly, a brake band passed over the nave with one end attached to the brake cup and the other to the forward end of the lever brake bar, a connecting rod or the like attached at one end to the rear end of said bar and at the other to a crank on a rockshaft provided with an operating lever.

In testimony whereof I have hereunto set my hand in presence of two subscribing witnesses.

JAMES JOSEPH O'DOHERTY.

Witnesses:
EDWARD WATERS,
EDWARD N. WATERS.

Copies of this patent may be obtained for five cents each, by addressing the "Commissioner of Patents, Washington, D. C."